United States Patent
Maier et al.

(10) Patent No.: US 6,786,433 B2
(45) Date of Patent: Sep. 7, 2004

(54) FUEL INJECTION VALVE

(75) Inventors: Martin Maier, Moeglingen (DE); Joerg Heyse, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 10/111,249

(22) PCT Filed: Jul. 19, 2001

(86) PCT No.: PCT/DE01/02710
§ 371 (c)(1),
(2), (4) Date: Aug. 15, 2002

(87) PCT Pub. No.: WO02/12719
PCT Pub. Date: Feb. 14, 2002

(65) Prior Publication Data
US 2003/0052201 A1 Mar. 20, 2003

(30) Foreign Application Priority Data
Aug. 4, 2000 (DE) .......................................... 100 38 098

(51) Int. Cl.[7] .............................. B05B 1/30; F02M 39/00
(52) U.S. Cl. ................................ 239/585.1; 239/585.3; 239/900; 239/585.5; 239/585.4; 239/533.3
(58) Field of Search ........................... 239/585.1–585.5, 239/88–93, 533.2, 533.3, 900, 533.9, 533.8, 533.14, 587.3; 251/129.15, 129.21

(56) References Cited

U.S. PATENT DOCUMENTS

| | | | | |
|---|---|---|---|---|
| 4,494,701 A | * | 1/1985 | Hensley et al. | 239/585.4 |
| 4,662,567 A | * | 5/1987 | Knapp | 239/585.4 |
| 5,875,975 A | * | 3/1999 | Reiter et al. | 239/585.1 |
| 6,035,532 A | * | 3/2000 | Earnhardt | 29/890.122 |
| 6,089,473 A | * | 7/2000 | Keim | 239/533.12 |

* cited by examiner

Primary Examiner—Davis D Hwu
(74) Attorney, Agent, or Firm—Kenyon & Kenyon

(57) ABSTRACT

A fuel injector, e.g., a fuel injector protruding directly into a combustion chamber of an internal combustion engine, includes an energizable actuator, a valve-closure member able to be moved by the actuator, a secure valve seat, with which the valve-closure member cooperates to open and close the valve, a fuel outlet formed in a downstream spray-discharge region and by at least one outlet opening situated downstream from valve seat, and a dead volume formed downstream from valve seat and upstream from the spray-discharge region having at least one outlet opening. A surface of valve-closure member bordering the dead volume has a surface structure having at least several pores with a surface roughness of at least 25 μm for gas accumulation.

12 Claims, 2 Drawing Sheets

FUEL INJECTION VALVE

FIELD OF THE INVENTION

The present invention is relates to a fuel injector.

BACKGROUND INFORMATION

During operation of an engine, a problem generally occurs in the case of direct injection of a fuel into the combustion chamber of an internal combustion engine, particularly in the case of direct gasoline injection or the injection of diesel fuel, that the downstream tip of the injection valve projecting into the combustion chamber is coked by fuel deposits or that soot particles formed in the flame front are deposited on the valve tip. Therefore, in the conventional arrangement of injection valves projecting into the combustion chamber, there is the danger during its lifetime of a negative influence on the spray parameter (e.g., static flow quantity, spray angle, drop size, skeining) that can lead to operational disturbances of the internal combustion engine or to a malfunction of the injection valve.

SUMMARY

The injector valve according to the present invention may provide the advantage that the negative effects of coking (soot depositing), e.g., on the valve tip projecting into the combustion chamber including its outlet openings may be restricted or eliminated. Forming a rough surface structure for accumulating combustion-chamber gas with access to the dead volume arranged between valve needle end and the spray region including the outlet openings in accordance with the present invention makes it possible to largely prevent coke deposits in the outlet openings. As a result of the buoyancy of the gas phase with respect to the fluid phase and of the large surface tension, the gas remains in the pores of the rough surface structure for accumulating combustion-chamber gas.

In this manner, the spray parameter and the valve function are able to be maintained in a stable manner during its entire lifetime even in the case of direct injection of fuel into a combustion chamber at the fuel injection valves.

A rough, porous surface structure may be provided on the valve needle end facing the outlet openings, i.e., on the surface of the valve-closure member facing the dead volume. The surface structure may be produced via roughening (cavity sinking, flash-etching, grinding with a coarse grain, introducing turning scores or grooves or the like) or by sintering the appropriate component part.

In addition, the pores of the rough surface that accumulate gas may also be used as vapor-forming nuclei, so that when the vapor pressure is not sufficient vapor bubbles of fuel are formed in the pores.

DETAILED DESCRIPTION

Figure 1:
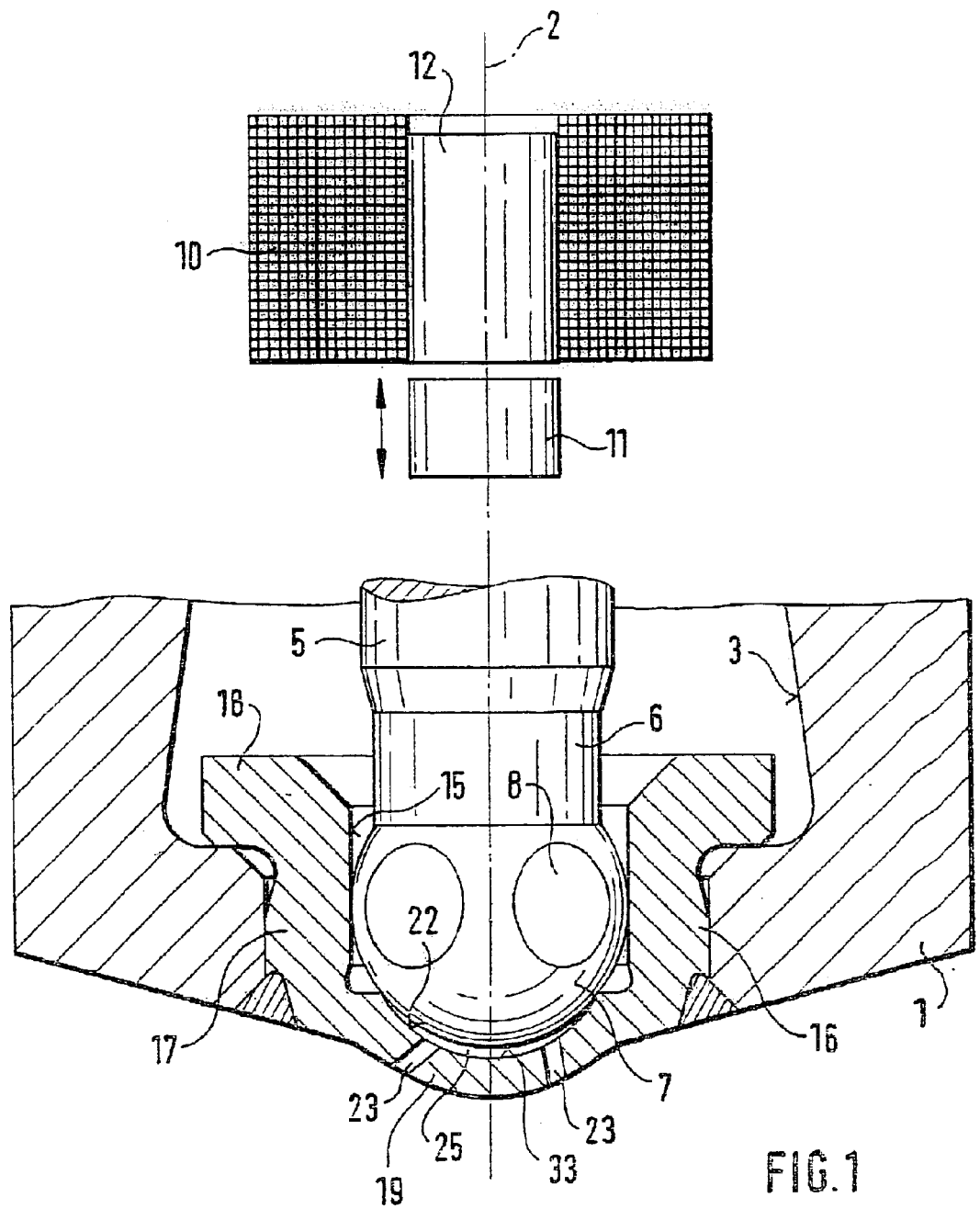
FIG. 1 is a cross-sectional view of a part of a fuel injector.

FIG. 1 partially illustrates a valve in the form of an injection valve for fuel injection systems of mixture-compressing, externally ignited internal combustion engines as an example embodiment. The injection valve has a tubular valve-seat support 1, in which a longitudinal opening 3 is formed concentrically to a longitudinal valve axis 2. Arranged in longitudinal opening 3 is a, for example, tubular valve needle 5, which is securely connected at its downstream end 6 to a, for example, spherical valve closure member 7, on the periphery of which, for example, five flattenings 8 are provided for the fuel to flow past.

The fuel injector is actuated in a conventional manner, e.g., electromagnetically. A schematically indicated electromagnetic circuit having magnetic coil 10, an armature 11, and an core 12 is used for axially moving valve needle 5, and as such, for opening the fuel injector against the spring force of a restoring spring and for closing the fuel injector. Armature 11 is connected, for example, by a welded seam formed by a laser to the end of valve needle 5 away from valve-closure member 7, and is aligned with core 12.

A guide opening 15 of a valve-seat member 16, which is sealingly mounted by welding in the downstream end of valve-seat support 1 away from core 12, in longitudinal opening 3, which extends concentrically to longitudinal valve axis 2, is used for guiding valve-closure member 7 during the axial movement. Valve-seat member 16 has a cupped configuration, for example, a jacket part 17 of valve-seat member 16 transitioning in the direction of armature 11 into a collar 18 abutting against valve-seat support 1. On the side opposite collar 18, valve-seat member 16 has a base part 19, which is convexly curved, for example.

The insertion depth of valve-seat member 16 determines the magnitude of the lift of valve needle 5 since the one end position of valve needle 5 in the case of a non-energized magnetic coil 10 is determined by the seating of valve-closure member 7 at valve-seat surface 22, which tapers conically in a downstream direction or has a slightly curved configuration, on base part 19 of valve-seat member 16. Given an energized magnetic coil 10, the other end position of valve needle 5 is determined, e.g., by the seating of armature 11 on core 12. The path between these two end positions of valve needle 5 represents the lift. Spherical valve-closure member 7 cooperates with truncated-cone-shaped or curved valve-seat surface 22 of valve-seat member 16, which is formed between guide opening 15 and a plurality of outlet openings 23 inserted in a central region of base part 19 of valve-seat member 16. Base part 19 forms the spray-discharge region of the fuel injector.

In particular, the fuel injector is configured as a so-called multi-hole valve that is particularly suited for injecting fuel directly into a combustion chamber. In this context, at least two or also four or significantly more outlet openings 23 are inserted in base part 19 of valve-seat member 16, e.g., via erosive machining, laser drilling, punching, etc. For a desired filling of the combustion chamber with fuel, outlet openings 23 are aligned, for example, at different angles to longitudinal valve axis 2, all outlet openings 23, for example, moving away from longitudinal valve axis 2 in the downstream direction at an angle.

Especially such multi-hole valves for directly injecting fuel into a combustion chamber the outlet openings of which are directly subjected to the combustion chamber atmosphere are extremely susceptible to coking. Such outlet openings may have build-up on their periphery due to coke deposits, thereby making it impossible for the desired injection quantities to be dosed and metered in acceptable amounts.

The fuel injector according to the present invention is configured to largely prevent coke deposits of the combustion chamber in the region of outlet openings 23 from obstructing the outlet openings and significantly changing the injection quantities during the valvels lifetime.

Since valve-closure member 7 and curved base part 19 of valve-seat member 16 are formed with different radii, there is, when the injector valve is closed, an enclosed space representing a dead volume 25 within annular valve-seat surface 22 in the region of outlet openings 23, between valve-closure member 7 and base part 19. In accordance with the present invention, gas is to be accumulated in dead volume 25 in order to prevent coke deposits at outlet openings 23.

Before this functional principle of gas accumulation is described, the creation of coke deposits is to be briefly explained.

Figure 2:
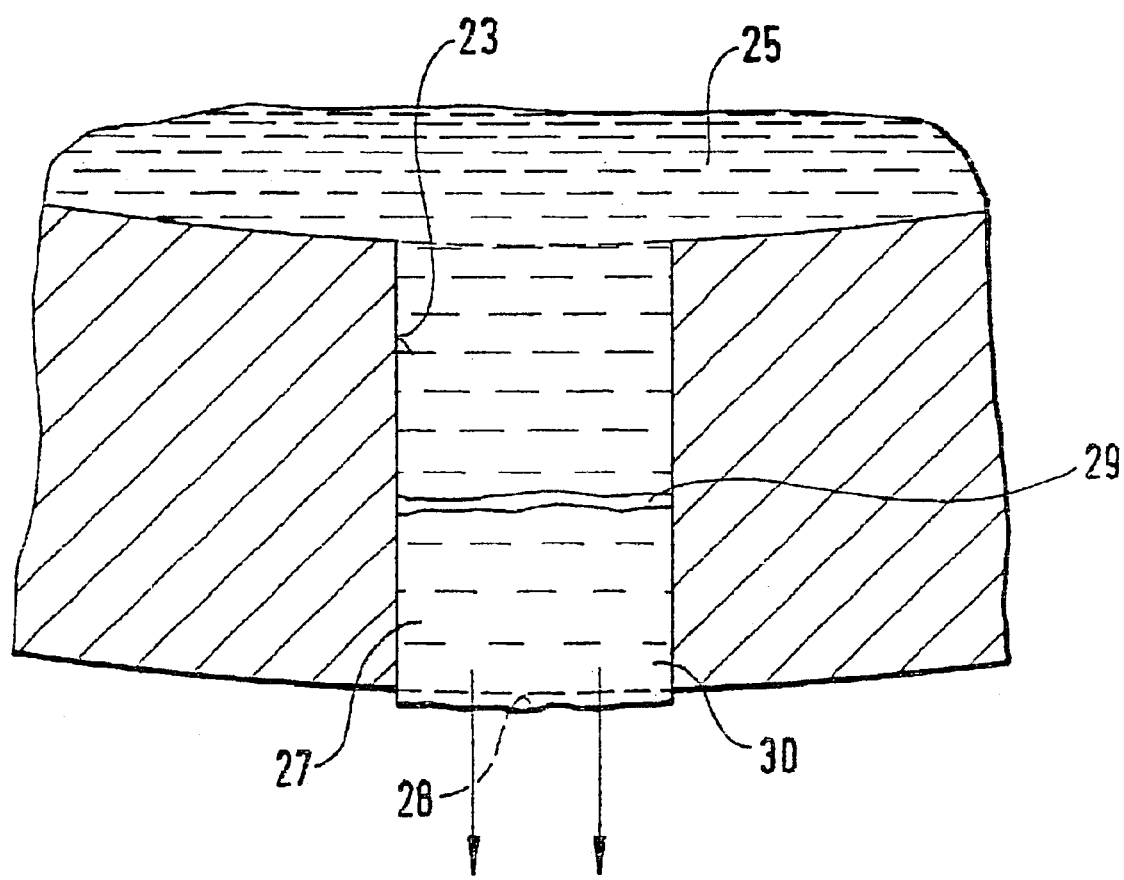
FIG. 2 is a schematic cross-sectional view of an outlet opening having a breaking-off liquid column arranged therein.

The processes of through-flow and coking are subsequently explained with reference to FIG. 2, which schematically illustrates an outlet opening 23. When valve-closure member 7 is pressed back at the end of the injection operation onto valve-seat surface 22, the flow through outlet openings 23 is stopped abruptly. Therefore, no more fuel continues to flow through the sealing seat region past valve-seat surface 22 into dead volume 25.

Due to its weight, liquid column 27, which is emerging from outlet openings 23 immediately prior to the closing of the valve, possesses a certain inertia. The low pressure in liquid column 27 produced as a result of the closing of the valve and of the associated stop of the flow in the sealing seat region becomes greater as a function of inertia starting from an outlet plane 28 of outlet opening 23 in the upstream direction within outlet opening 23. At a certain location 29 within liquid column 27, the vapor pressure of the liquid is insufficient. A vapor phase forms suddenly at this location 29, thereby causing part 30 of liquid column 27, which is downstream of this location 29, to break away from the remaining liquid as a result of inertia. A meniscus of liquid at which there is a phase boundary between the liquid and the gas surrounding the valve forms within outlet opening 23. When injecting fuel directly into a combustion chamber, all components directly on the combustion chamber, therefore also a direct injection valve, in particular outlet openings 23, which project into the combustion chamber, are subjected to an extreme influence of heat. During combustion, coke residues may form on the above-mentioned phase boundary in particular and build-up on the wall of outlet opening 23, thereby resulting in the previously explained disadvantages. Consequently, in the case of conventional valves, annular coke deposits that disadvantageously constrict flow result at a certain depth in outlet openings 23.

In the configuration of the fuel injector according to the present invention, outlet openings 23 are completely emptied for which reason no coke deposits are able to form within outlet openings 23. In accordance with the present invention, a surface treatment with which a roughness of surface 33 for gas accumulation is produced is, therefore, performed directly on a component part bordering dead volume 25, either on valve-closure member 7 or on valve-seat member 16 in this instance.

At least one of surfaces 33, bordering dead volume 25, of the downstream valve needle end, i.e., of valve-closure member 7 and of valve-seat member 16 having the downstream spray-discharge region has a porous structure. Porous surface 33 is produced, e.g., by roughening (cavity sinking, flash-etching, grinding with a coarse grain, introducing turning scores or grooves, sandblasting, bombarding with metal balls, etc.) or by sintering the appropriate component part. After this surface treatment, surface 33 has a surface structure having at least several pores with a surface roughness of at least 25 $\mu$m for gas accumulation.

The smallest gas bubbles are able to be retained in the individual pores in roughened surface 33. In the case of a possibly sintered component part, the gas phase is accumulated in the numerous hollow spaces of the material structure, even in material regions farther away from immediate surface 33. The gas bubbles accumulated in the pores of roughened surface 33 are very small, so that their high surface tension and resulting good adhesion makes them unable to be flushed out of the pores by the fluid flow.

When opening the valve by raising valve-closure member 7 from valve-seat surface 22, the fluid pressure in dead volume 25 increases, thereby compressing the gas volume in the pores of surface 33. When closing the valve, the fluid pressure decreases again, and the gas volume expands again within the pores. Since additional fluid is prevented from flowing into dead volume 25 when the valve is closed, an underpressure is produced in the liquid phase as a result of the inertia of the just emerged fluid. As a result, the gas volume of the pores of surface 33 is able to expand even further, so that it partially reaches into dead volume 25. The fluid volume expelled in this manner is able to flow out of outlet opening 23.

While a pressure equilibrium returns in dead volume 25, the remaining fluid volume recedes from outlet openings 23 into dead volume 25 as a result of a contraction of the gas phase. Outlet openings 23 fill completely with combustion chamber gas. The liquid column disappears completely from outlet openings 23. In this manner, there is also no more meniscus of liquid column 27 in outlet opening 23 for which reason disadvantageous, annular coking deposits are also not able to form in outlet opening 23.

A further effect of roughened surface 33 is that the gas-accumulating pores function as a vapor-forming arrangement. In the case of the above-described pressure drop in the combustion chamber caused by the closing of the valve, vapor bubbles of fuel form in the pores when the vapor pressure is insufficient. The growth of the vapor bubbles causes liquid fuel to be expelled from dead volume 25. After a pressure equilibrium is set in dead volume 25, the remaining fluid volume recedes from outlet openings 23 into dead volume 25 as the result of a contraction of the gas phase.

The valve needle tip, i.e., valve-closure member 7 is not the only component part of the fuel injector on which the surface roughness of the present invention is able to be provided.

Rather, it may only be ensured that surface 33 having the desired roughness partially borders dead volume 25.

What is claimed is:

1. A fuel injector comprising:
    an energizable actuator;
    a valve-closure member configured to be moved by the actuator;
    a secure valve seat configured to cooperate with the valve-closure member to open and close the valve;
    a fuel outlet formed in a downstream spray-discharge region and by at least one outlet opening arranged downstream from the valve seat; and
    a dead volume formed downstream from the valve seat and upstream from the spray-discharge region having at least one outlet opening;
    wherein at least one surface of a component part bordering the dead volume includes a surface structure having direct access to the dead volume and at least several pores with a surface roughness of at least 25 $\mu$m configured to accumulate combustion chamber gas.

2. The fuel injector according to claim 1, wherein the surface is porous.

3. The fuel injector according to claim 1, wherein the surface structure of the surface is roughened by cavity sinking.

4. The fuel injector according to claim 1, wherein the surface structure of the surface is roughened by flash-etching.

5. The fuel injector according to claim 1, wherein the surface structure of the surface is roughened by grinding with a course grain.

6. The fuel injector according to claim 1, wherein the surface structure of the surface is roughened by introducing at least one of turning scores and grooves.

7. The fuel injector according to claim 1, wherein the surface structure of the surface is produced by sintering the component part having the surface.

8. The fuel injector according to claim 1, wherein the surface structure is provided on a downstream valve needle end facing the outlet openings.

9. The fuel injector according to claim 1, wherein the surface structure is provided on the valve-closure member on the surface facing the dead volume.

10. The fuel injector according to claim 1, wherein the gas-accumulating pores of the surface are configured as a vapor-forming arrangement.

11. The fuel injector according to claim 1, wherein the fuel injector protrudes into a combustion chamber of an externally ignited internal combustion engine.

12. The fuel injector according to claim 1, wherein the fuel injector is configured to protrude into a combustion chamber of a self-igniting internal combustion engine.

* * * * *